United States Patent
Brismar et al.

(10) Patent No.: US 9,967,805 B2
(45) Date of Patent: May 8, 2018

(54) EXTENDED SYSTEM INFORMATION DISTRIBUTION MECHANISMS

(71) Applicant: Telefonaktiebolaget L M Ericsson (publ), Stockholm (SE)

(72) Inventors: Sofia Brismar, Lidingö (SE); Joakim Bergström, Stockholm (SE); Erik Larsson, Uppsala (SE); Fredrik Ovesjö, Älvsjö (SE); Johan Rune, Lidingo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 262 days.

(21) Appl. No.: 14/768,250

(22) PCT Filed: Jan. 22, 2014

(86) PCT No.: PCT/SE2014/050074
§ 371 (c)(1),
(2) Date: Aug. 17, 2015

(87) PCT Pub. No.: WO2014/129951
PCT Pub. Date: Aug. 28, 2014

(65) Prior Publication Data
US 2015/0382284 A1    Dec. 31, 2015

Related U.S. Application Data

(60) Provisional application No. 61/769,073, filed on Feb. 25, 2013.

(51) Int. Cl.
*H04W 4/00* (2009.01)
*H04W 48/12* (2009.01)
(Continued)

(52) U.S. Cl.
CPC ......... *H04W 48/12* (2013.01); *H04W 28/085* (2013.01); *H04W 74/04* (2013.01); *H04W 48/10* (2013.01)

(58) Field of Classification Search
CPC ... H04W 48/12; H04W 28/085; H04W 74/04; H04W 48/10
See application file for complete search history.

(56) References Cited

U.S. PATENT DOCUMENTS 8,538,444 B2 * 9/2013 Lee ........................ H04W 48/12
455/450
9,699,710 B2 * 7/2017 Lee ........................ H04W 48/12
(Continued)

FOREIGN PATENT DOCUMENTS

| EP | 1 799 003 A1 | 6/2007 | |
| EP | 1799003 A1 * | 6/2007 | ............ H04W 48/10 |
| WO | WO 2011/035420 A1 | 3/2011 | |

OTHER PUBLICATIONS

International Search Report for International application No. PCT/SE2014/050074, dated Jul. 16, 2014.
(Continued)

*Primary Examiner* — Maharishi Khirodhar
(74) *Attorney, Agent, or Firm* — Baker Botts, LLP

(57) ABSTRACT

A disclosed method is implemented by a network node in a wireless communication network to transmitting system information to a plurality of wireless terminals. The network node transmits a first group of system information blocks (SIBs) via a first physical channel, and transmits a second group of additional SIBs via a different, second physical channel. A corresponding network node operative to implement the method is also disclosed. Another disclosed method is implemented by a wireless terminal in a wireless communication network. The wireless terminal processes information received from a base station over a first physical
(Continued)

channel to identify a first group of SIBs, and processes information received from the base station over a different, second physical channel to identify a second group of additional SIBs. A corresponding wireless terminal operative to implement the method is also disclosed.

15 Claims, 12 Drawing Sheets

(51) Int. Cl.
  *H04W 28/08* (2009.01)
  *H04W 74/04* (2009.01)
  *H04W 48/10* (2009.01)

(56) References Cited

U.S. PATENT DOCUMENTS

| | | | | |
|---|---|---|---|---|
| 9,712,307 | B2* | 7/2017 | Lee | H04L 5/0053 |
| 2002/0141331 | A1* | 10/2002 | Mate | H04W 72/1273 |
| | | | | 370/218 |
| 2009/0319903 | A1* | 12/2009 | Alanara | H04W 72/1289 |
| | | | | 715/733 |
| 2010/0027466 | A1* | 2/2010 | Mustapha | H04J 11/0069 |
| | | | | 370/328 |
| 2010/0068993 | A1* | 3/2010 | Khan | H04B 7/1853 |
| | | | | 455/12.1 |
| 2010/0167746 | A1 | 7/2010 | Lee et al. | |
| 2012/0327895 | A1* | 12/2012 | Wallen | H04W 48/12 |
| | | | | 370/330 |
| 2014/0086145 | A1* | 3/2014 | Ramkumar | H04H 20/16 |
| | | | | 370/328 |

OTHER PUBLICATIONS

PCT Written Opinion of the International Searching Authority for International application No. PCT/SE2014/050074, dated Jul. 16, 2014.

3GPP TSG RAN WG1 Ad Hoc on LTE; Sophia Antipolis, France; Title: Downlink Channelization and Multiplexing for EUTRA (R1-050604), Jun. 20-21, 2005.

Office Action issued by the Intellectual Property Office of Taiwan for Republic of China, Patent Application No. 10621165330, dated Nov. 10, 2017, 12 pages.

* cited by examiner

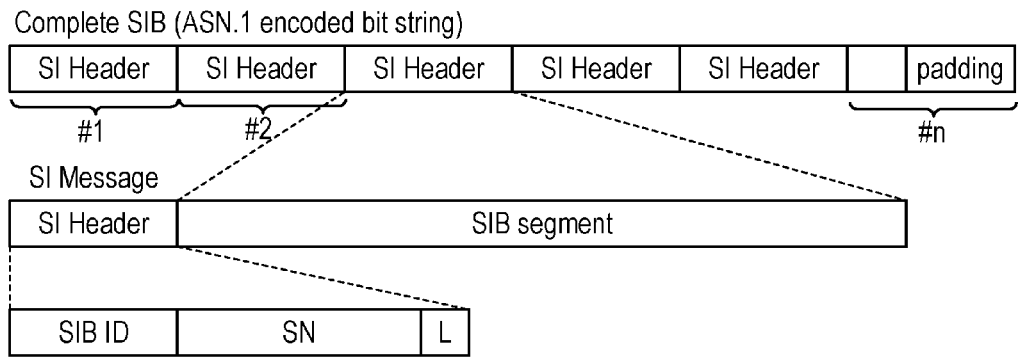
FIG. 6
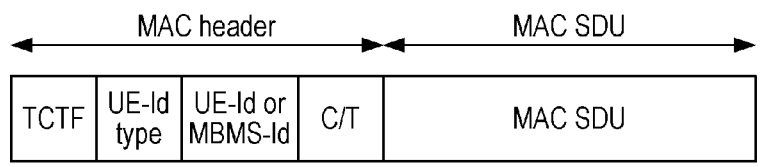
FIG. 7
| TCTF | DESIGNATION |
|---|---|
| 00 | CCCH |
| 01 | DCCH or DTCH over RACH |
| 10-11 | Reserved (PDUs with this coding will be discarded by this version of the protocol) |
FIG. 8
*(PRIOR ART)*

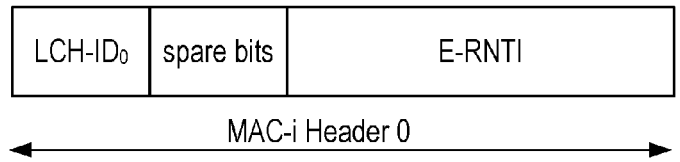
FIG. 10
*(PRIOR ART)*
| LCH-ID Field | DESIGNATION |
|---|---|
| 0000 | Logical channel 1 |
| 0001 | Logical channel 2 |
| ... | ... |
| 1101 | Logical channel 14 |
| 1110 | Identification of CCCH (SRB0) |
| 1111 | Identification of E-RNTI being included |
FIG. 11
*(PRIOR ART)*
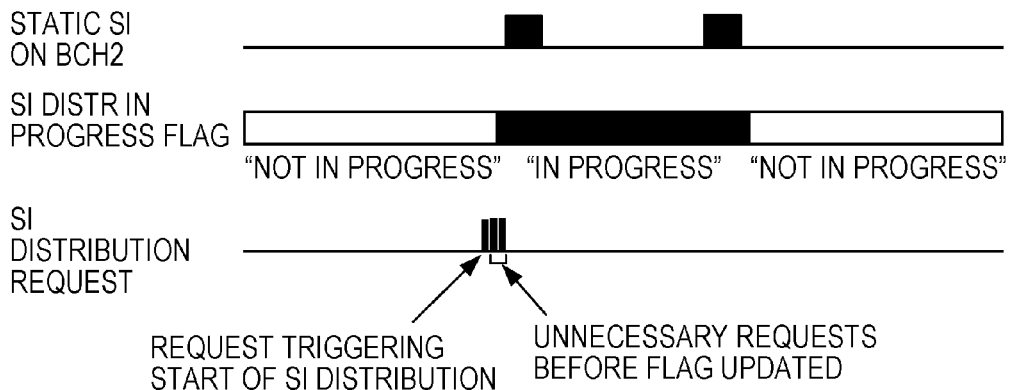
FIG. 12

EXTENDED SYSTEM INFORMATION DISTRIBUTION MECHANISMS

RELATED APPLICATIONS

This application claims the benefit of provisional Application No. 61/769,037, filed on Feb. 25, 2013, the disclosure of which is incorporated herein by reference in its entirety.

PRIORITY

This nonprovisional application is a U.S. National Stage Filing under 35 U.S.C. §371 of International Patent Application Serial No. PCT/SE2014/050074 filed Jan. 22, 2014, and entitled "EXTENDED SYSTEM INFORMATION DISTRIBUTION MECHANISMS" which claims priority to U.S. Provisional Patent Application No. 61/769,073 filed Feb. 25, 2013, both of which are hereby incorporated by reference in their entirety.

TECHNICAL FIELD

The subject matter described herein generally relates to wireless communication networks. In particular, the subject matter relates to methods, apparatuses, and/or systems for distribution of system information. Terminologies from the Third Generation Partnership Project (3GPP) are used below only to facilitate explanation and example application. Wireless systems such as Worldwide Interoperability for Microwave Access (WiMax), Ultra Mobile Broadband (UMB), Global System for Mobile Communications (GSM), WiFi, and others may benefit from the technology described herein.

BACKGROUND

In a wireless network such as a 3GPP Wideband Code Division Multiple Access (WCDMA) network, system information (SI) distribution provides the ability to schedule and broadcast system information over the network air interface. Typically, system information is generated in the Radio Network Controller (RNC) passed to the Radio Base Station (RBS) using the Node B Application Protocol (NBAP) procedure System Information Update. RBS repeats the information periodically on the Broadcast Control Channel (BCCH) which is mapped to a Broadcast Channel (BCH) transport channel carried by the Primary Common Control Physical Channel (P-CCPCH) in the cell.

System information is grouped into different System Information Blocks (SIBs), where each SIB contains information elements of the same nature. Different system information blocks may have different characteristics, e.g., regarding their repetition rate and the requirements on User Equipment (UEs) to re-read the information.

The Master Information Block (MIB), which is also broadcasted over the air interface, provides references and scheduling information to a number of SIBs in the cell. The scheduling of the MIB is standardized by 3GPP. The repetition period is 80 ms (every fourth 20 ms Transmission Time Interval "TTI") and the start position is System Frame Number (SFN)=0, i.e., the MIB is transmitted in every BCH TTI starting at SFNs where (SFN mod 8)=0. SIB references can also be provided by separate Scheduling Blocks (SBs). A scheduling block is always referenced from the MIB. FIG. 1 illustrates an example structure of SIBs.

The scheduling information in the MIB/SB provides a list of the SB/SIBs transmitted in the cell and their location on the broadcast channel. The scheduling information also contains a value tag (or an expiration timer) for each SIB that gives information to the UE about the version and validity of the information currently sent on the broadcast channel.

Currently, to acquire the necessary SIBs transmitted on the broadcast channel, the UE must first read the MIB to get references to the first level of SIBs. After that the UE needs to read the Scheduling Block to get references to the remaining SIBs.

One RRC SI message is transmitted in each 20 ms TTI on the BCH using RLC transparent mode. The SI message contains:
- The system frame number (SFN) for the first radio frame in the TTI;
- a SIB segment and/or one or several complete SIBs (this information is optional and only included if SIB data is scheduled in the TTI).

If the SI message does not completely fill the transport block, padding is added up to the transport block size of 246 bits.

Different update mechanisms apply for the SIBs depending on whether they contain static or dynamic information. For SIBs containing static information, a value tag is used to indicate when there is a need for the UE to read new information on the broadcast channel. The SIB value tag is sent together with the scheduling information in the MIB or in SB. Whenever the SIB content is modified, the corresponding SIB value tag is updated by the network. Due to the layered structure, a change on the lowest SIB level will propagate all the way up to the MIB, i.e., both the SB- and the MIB value tags will be incremented as well. The new MIB value tag is signaled in message Paging Type 1 (on Paging Channel "PCH") and System Information Change Indication (on the Forward Access Channel "FACH" and High Speed Downlink Shared Channel "HS-DSCH") to notify the UEs about the updated system information. Once the UE receives the notification, it will start from the top and compare the new value tags signaled on the broadcast channel with the stored value tags. If they differ, the UE needs to reacquire the SIB to get the updated information.

For SIBs containing dynamic information, an expiration timer is used as an update mechanism. When the timer expires, the corresponding SIB information which the UE has stored is considered to be invalid and the UE must acquire the system information block again.

Note that a particular UE at a certain time may require valid information only for a subset of all SIBs broadcasted in the cell. Which SIBs the UE requires depends on the features supported by the UE and the current RRC state (idle mode, PCH or FACH).

The existing system information distribution mechanism was introduced in 3GPP Rel-99 and has not been changed since then. As a result of the High Speed Packet Access (HSPA) feature growth during the past RAN releases, the available BCH capacity of 12 kbps is almost filled up by existing MIB/SB/SIBs supporting features up to Rel-8.

In particular, the following problems related to the current distribution mechanism have been identified:

Fragmentation:

Although it is possible to concatenate the last segment (or first segment) of a SIB with one or several complete SIBs in the same transport block, the BCH channel is getting more and more fragmented as the number of SIBs and SIB segments increases. The main contributor is the MIB that must be repeated on the broadcast channel every 4th TTI.

Even if the MIB itself does not occupy the full transport block, it is difficult to use the remaining parts in an efficient way.

When more features are enabled in the network, the size of the existing SIBs (e.g., SIB3, SIB5 and SIB11) increases and there is a need to schedule more subsequent segments for each SIB. A subsequent segment requires a TTI of its own and cannot be concatenated with other complete SIBs or SIB segments, i.e., it cannot reuse unfilled parts of the transport blocks. Mixing SIBs with different repetition periods also generates "gaps" on the broadcast channel that can be hard to fill considering that the offset between two consecutive segments of the same SIB is limited to 320 ms by the existing standard.

Scheduling Overhead:

The UE is informed about the exact position of each SIB segment as well as the value tag (or expiration timer) and scope ("cell" or "PLMN") of the SIB. When the number of SIB segments increases on the broadcast channel, the scheduling overhead grow as well. The UE must first read the scheduling information contained in the MIB and the Scheduling Blocks to find the positions of the SIBs to be acquired. Thus, it is important that the scheduling information be repeated frequently to ensure that the overall time to read system information is acceptable. Today, the scheduling information occupies approximately 25% of the total BCH capacity.

Layered MIB/SB/SIB Structure:

The current SIB structure uses up to three layers which can delay the system information acquisition. When a SIB is modified, the UE must first read the MIB, followed by the Scheduling Block, to find out which SIB value tag has been changed. After that, the UE is able to read the new SIB and update the corresponding information.

No DTX Support:

The current SIB structure does not support a DTX format to be used when there is no system information scheduled for the TTI (except the SFN). This costs unnecessary DL transmit power.

SUMMARY

According to one aspect of the present disclosure, a method is implemented by a network node in a wireless communication network for transmitting system information to a plurality of wireless terminals. According to the method, the network node transmits a first group of SIBs via a first physical channel, and transmits a second group of additional SIBs via a different, second physical channel.

In one or more embodiments, the first physical channel is configured to be read by a first group of wireless terminals and also by a different, second group of wireless terminals, and the second physical channel is configured to be read by only one of the first and second group of wireless terminals. In one example, the first physical channel is the P-CCPCH, and the second physical channel is one of the S-CCPCH and the HS-PDSCH.

In one or more embodiments, the network node method also includes the network node transmitting, via the first physical channel, scheduling information for reception of the additional SIBs on the second physical channel. The scheduling information may be included in a scheduling block transmitted via the first physical channel.

In one or more embodiments, the network node method also includes the network node transmitting, via the second physical channel, scheduling information for reception of the additional SIBs, and also transmitting, via the first physical channel, either additional scheduling information for reception of the additional SIBs or an indication that the additional SIBs are going to be transmitted via the second physical channel.

In one or more of the embodiments discussed above, the transmitting of the second group of additional SIBs via the second physical channel includes transmitting, via the second physical channel, one or more first SIBs that only include static system information, and transmitting, via the second physical channel, one or more second SIBs that only include dynamic system information.

A corresponding network node configured to implement the various network node methods discussed above is also disclosed.

According to another aspect of the present disclosure, a method is implemented by a wireless terminal in a wireless communication network for processing system information. The wireless terminal processes information received from a base station over a first physical channel to identify a first group of SIBs, and also processes information received from the base station over a different, second physical channel to identify a second group of additional SIBs.

In one or more embodiments, the first physical channel is configured to be read by a first group of wireless terminals and also by a different, second group of wireless terminals, and the second physical channel is configured to be read by only the second group of wireless terminals. In such embodiments, the wireless terminal is part of the second group of wireless terminals. In one example, the first physical channel is the P-CCPCH, and the second physical channel is one of the S-CCPCH and the HS-PDSCH.

In one or more embodiments, the wireless terminal identifies the second group of additional SIBs based on processing information received from the base station over the first physical channel to identify scheduling information for reception of the additional SIBs on the second physical channel.

In one or more embodiments, the wireless terminal method also includes the wireless terminal processing information received from the base station over the second physical channel to identify scheduling information for reception of the additional SIBs. In these embodiments, the wireless terminal method also includes processing information received from the base station over the first physical channel to identify either additional scheduling information for reception of the additional SIBs or an indication that the additional SIBs are going to be transmitted via the second physical channel.

In one or more embodiments, the processing of information received from the base station over the second physical channel to identify the second group of additional SIBs includes identifying, from the information received over the second physical channel, one or more first SIBs that only include static system information, and identifying, from the information received over the second physical channel, one or more second SIBs that only include dynamic system information.

A corresponding wireless terminal configured to implement the various wireless terminal methods discussed above is also disclosed.

BRIEF DESCRIPTION OF THE DRAWINGS

FIG. 2b illustrates an example network node method for the SIB structure of FIG. 2a.

FIG. 2c illustrates an example UE method for the SIB structure of FIG. 2a.

FIG. 3b illustrates an example network node method for the SIB structure of FIG. 3a.

FIG. 3c illustrates an example UE method for the SIB structure of FIG. 3a.

FIG. 4b illustrates an example network node method for the SIB structure of FIG. 4a.

FIG. 4c illustrates an example UE method for the SIB structure of FIG. 4a.

FIG. 5b illustrates an example network node method for the SIB structure of FIG. 5a.

FIG. 5c illustrates an example UE method for the SIB structure of FIG. 5a.

FIG. 6 illustrates an example mapping of SIB segments to SI messages.

FIG. 7 illustrates an example MAC PDU for transmission on a RACH.

FIG. 8 illustrates an example coding for a TCTF field of the MAC PDU of FIG. 7.

FIG. 10 illustrates an example header for the MAC-i PDU of FIG. 9.

FIG. 11 illustrates an example LCH-ID field coding for the MAC-I header of FIG. 10.

FIG. 12 illustrates an example on-demand distribution of system information.

FIG. 18b illustrates an example hardware configuration for the network node of FIG. 16a.

FIG. 19b illustrates an example hardware configuration for the wireless terminal of FIG. 17a.

DETAILED DESCRIPTION

Figure 1:
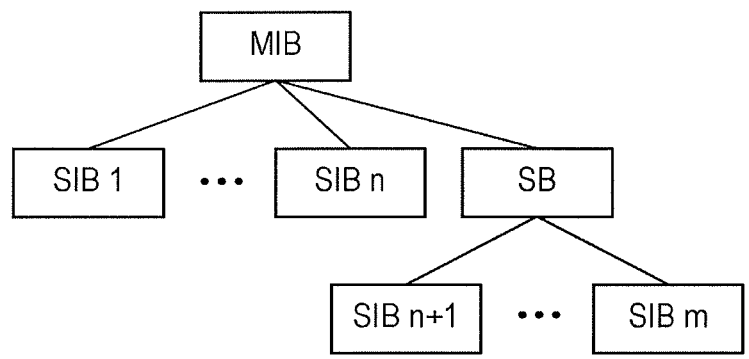
FIG. 1 illustrates an example SIB structure.

To accommodate new system information on the broadcast channel, the existing system information may be transmitted less often. Unfortunately, this will result in longer time for the UE to acquire the necessary SIBs, i.e., increase latency. This could, for example, increase the call setup- and up-switch times from URA/FACH as well as the outage times at IRAT and Inter-frequency cell reselection. Considering that UEs will spend more time in URA/PCH and CELL_FACH states in the future, it is extremely important to minimize performance degradation performance of these states.

The format of the existing broadcast channel may be modified to accommodate the new system information. But note that the broadcast channel is read and needs to be understood by all UEs currently deployed in the networks. All SIBs needed for these legacy UEs need to be transmitted using the existing Rel-99 framework for system information distribution. This implies that there is very limited flexibility to change the format of the existing broadcast channel.

In order to secure the growth for coming releases (e.g., upcoming HSPA releases), there is a need to extend the system information capacity, while maintaining backwards compatibility for the existing UEs.

As indicated above, it is desired to extend the system information distribution mechanism to accomplish the following goals (among others):

Accommodate distribution of new system information;
Maintain compatibility with legacy UEs;
Minimize latencies.

In one or more aspects, a network may utilize a plurality of (i.e., two or more) system information distribution channels to distribute the system information to the wireless terminals (e.g., UEs). For example, first, second, third . . . etc. distribution channels may be used. At least one distribution channel, e.g., the first distribution channel, may be used maintain backwards compatibility with the currently existing SI distribution mechanism. The first distribution channel may also be referred to as a legacy distribution channel. At least one other distribution channel, e.g., the second distribution channel, may be used to extend the SI distribution mechanism for those UEs that capable of understanding the extended mechanism. The second distribution channel may also be referred to as an extended distribution channel.

In the following, SI distribution using first (legacy) and second (extended) SI distribution channels will be described. However, the scope of description can be extended to cover more than two distribution channels.

For ease of reference, the existing SI distribution mechanism for SI broadcast may be referred to as "Broadcast 1" or "BC1." As an illustration, the SI broadcast as specified by 3GPP Rel-99 framework may be considered to be an example of the BC1 mechanism. The scope of the BC1 mechanism may cover all protocols (e.g., NBAP, RRC, L1) and channels (logical channel: BCCH, transport channel: BCH, physical channel: P-CCPCH) used for existing system information distribution.

The SI broadcast for the extended distribution may be referred to as "Broadcast 2" or "BC2." It is intended that the scope of the BC2 mechanism covers protocols and channels (logical channels/transport channels/physical channels) to be used for the new system information distribution mechanism.

Embodiments of SIB Structures for Extended SI Distribution

Figure 2A:
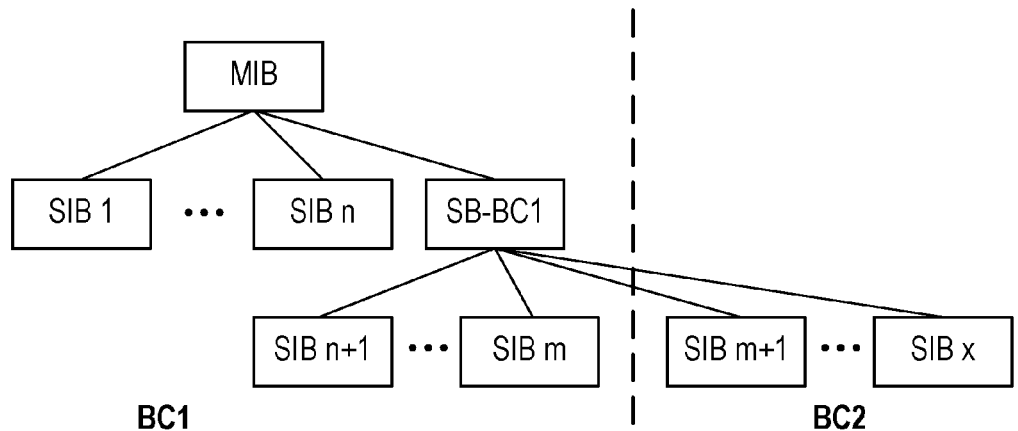
FIG. 2*a* illustrates an example SIB structure according to a first embodiment.

Examples of multiple mechanisms to extend the SI distribution are presented below. In a first embodiment, the existing BC1 mechanisms are reused as much as possible. An example SIB structure is illustrated in FIG. 2a. The scheduling information in the SB-BC1 in the first distribution channel may be extended to enable references to the new SIBs transmitted on the second distribution channel. The information included in the SB-BC1 may include any one or more of:

a SIB type which identifies the SIBs (e.g., SIB m+1 . . . SIB x). The SIB type may implicitly indicate that the SIB is transmitted on the second distribution channel utilizing the BC2 mechanism;

an explicit indication that the SIB is transmitted on the second distribution channel utilizing the BC2 mechanism;

an indication whether the area scope of the SIB is "cell" or "PLMN";

a value tag if the SIB includes static information;

an expiration timer if the SIB includes dynamic information;

a start position (e.g., SFN) on the second distribution channel where the first SIB segment (e.g., SIB m+1) is scheduled and optionally one or several offset parameters if the subsequent SIB segments are not sent in consecutive TTIs;

a repetition period indicating how often the SIB is repeated on the broadcast channel.

While not illustrated in FIG. 2a, the scheduling block in the MIB in the first distribution channel may be extended to refer to the SIBs transmitted on the second distribution. Also, both the MIB and the SB may be extended.

Figure 2B:
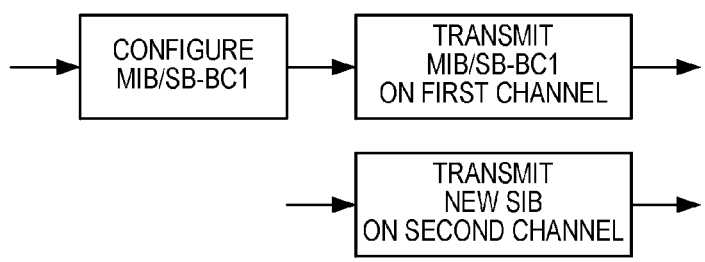

FIG. 2b illustrates an example of a method performed by a network node (e.g., RNC, RBS) to distribute system information using the SIB structure of FIG. 2a. It should be noted that the order of transmitting MIB/SB-BC1 on the first channel and the new SIB on the second channel is not particularly significant. They may be transmitted sequentially one after the other or in parallel. They may even partially or totally overlap. In this and in other embodiments described below, the same concept may apply. That is, unless otherwise explicitly indicated, the order of the SIB related information transmitted from the network node is not particularly significant.

The UE may use the legacy BC1 acquisition mechanisms to find the references to the new SIBs on BC2. For example, based on the SIB type (or the new BC1/BC2 indicator), the UE may read the SIB on either BC1 or BC2. Above, it is indicated that the SIB type may implicitly indicate that the SIB is transmitted on the second distribution channel. But also as indicated, this information may be explicitly indicated. This can be useful in circumstances where the SIB type by itself is insufficient to conclude that the SIB is transmitted on the second distribution channel.

Figure 2C:
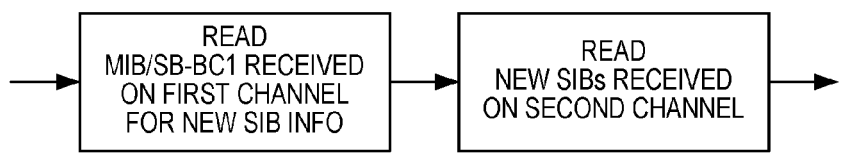

FIG. 2c illustrates an example method performed by a UE to access the new SIB of FIG. 2a on a second distributions channel. Just as the MIB/SB-BC1 and the new SIBs may be transmitted by the network in any order, the UE may also receive the same in any order. The UE may receive and store the received information in any order. However, the received information may be decoded in the order illustrated in FIG. 2c. In this and other embodiments described below, the UE may receive the SIB related information transmissions (and store them) in a random order unless specifically stated otherwise.

Before proceeding further, the following should be noted. The new SIBs—those that are not understood by the legacy UEs—may be transmitted utilizing the extended mechanism BC2. However, this does not necessarily preclude using the second distribution channel to transmit existing SIBs that are understood by the legacy UEs. For example, SIB m+1 may be an example of a new SIB (not understood by legacy UEs) and SIB x may be an example of a legacy SIB. One (of which there can be several) reason for utilizing the BC2 mechanism to transmit legacy SIBs may be to balance the load of distributing the SIBs. This concept of possibly utilizing the BC2 mechanism to distribute legacy SIBs may apply to the first embodiment, and to some or all of the other embodiments described below.

In this embodiment, legacy update mechanisms may be reused. When the network (e.g., the RNC, RBS) modifies the content of a SIB transmitted on the second distribution channel, the network may also increment the SIB value tag contained in SB-BC1. The change may propagate up to the MIB on BC1, and the new MIB value tag may be signaled to the UE, e.g., on the PCH and FACH/HS-DSCH transport channels, using the legacy notification messages. For dynamic SIBs, expiration timers may be used.

Figure 3A:
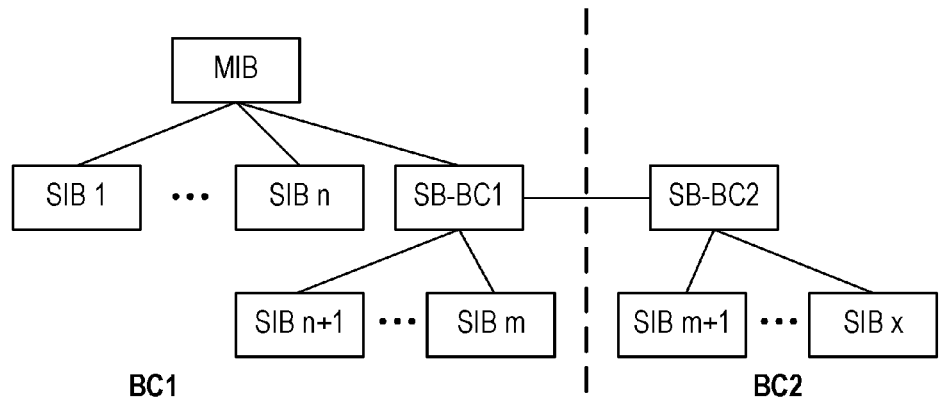
FIG. 3a illustrates a SIB structure according to a second embodiment.

FIG. 3a illustrates an example of a second embodiment of the SIB structure. In this embodiment, the scheduling block (SB-BC1) or the MIB in the first distribution channel may point to a new extended scheduling block (SB-BC2) on the second distribution channel. SB-BC2 in turn may list and provide scheduling information for the SIBs transmitted on the second distribution channel.

Figure 3B:
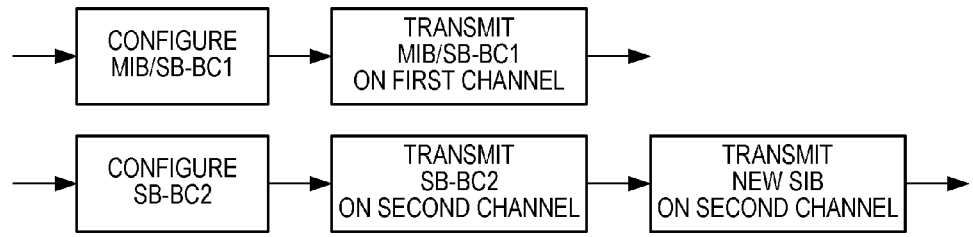

FIG. 3b illustrates an example of a method performed by a network node (e.g., RNC, RBS) to distribute system information for the SIB structure of FIG. 3a. The scheduling information for SB-BC2 provided in SB-BC1, or in the MIB, may include some or all of the information elements listed for the first embodiment describe above (e.g., area scope, value tag/expiration timer, start position, offset and repetition period). Similarly, the SB-BC2 can include some or all of the scheduling information elements per referenced SIB, or a subset of the information. The SIBs on BC2 can also be referenced using a new set of scheduling information elements included in SB-BC2. Again, the order is not particularly significant.

In this second embodiment, the UE may first use the legacy BC1 acquisition mechanisms to find a reference to the new Scheduling Block on BC2. Once the SB-BC2 has been acquired, the UE can then find the remaining SIBs on second distribution channel.

Figure 3C:
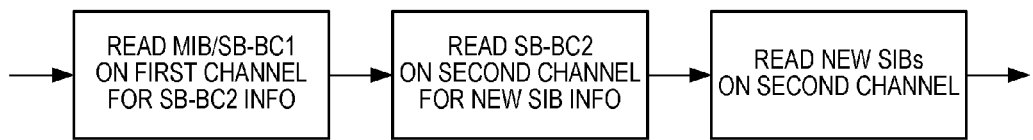

FIG. 3c illustrates an example method performed by the UE to access the SIB of FIG. 3a on a second distributions channel. Again, the order of operations in FIG. 3c may indicate the order of decoding the received information—it does not necessarily indicate the order of information reception.

Similar to the first embodiment, legacy update mechanisms may be reused for the second embodiment. When the network modifies the content of a SIB transmitted on the second distribution channel, the network may also increment the SIB value tag contained in SB-BC2. The change may propagate up to the MIB on BC1 via the SB-BC1, and the new MIB value tag may be signaled to the UE, e.g., on the PCH and FACH/HS-DSCH transport channels, using the legacy notification messages.

Figure 4A:
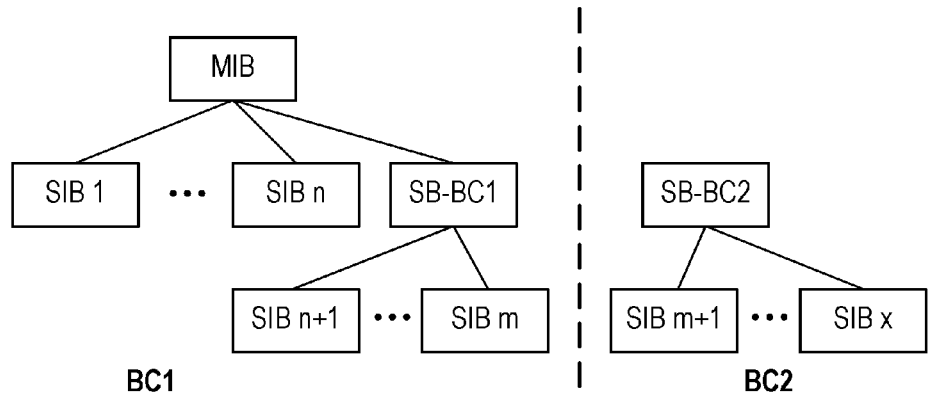
FIG. 4a illustrates an example SIB structure according to a third embodiment.

FIG. 4a illustrates an example of a third embodiment of the SIB structure. In this embodiment, the presence of BC2 may be indicated in the MIB or in SB-BC1 on the first distribution channel using a new "BC2 indicator" (second distribution channel indicator). The MIB and/or SB-BC1 may include the BC2 indicator information element.

When BC2 is enabled and the "BC2 indicator" is set, the network node may repeat the scheduling block on BC2 using a start position and repetition period. One or both of the start position and the repetition period may default to predetermined values. For example, they may be defined by a standard (e.g., 3GPP). In an alternative, the start position and/or the repetition period may be provided in the MIB and/or the SB-BC1. As yet another alternative, there may be default start position and/or repetition period that can be superseded by the values provided in the MIB and/or the SB-BC1. Compared to the first and second embodiments described above, the third embodiment may minimize the additional scheduling overhead that needs to be included on BC1 in order to support BC2.

SB-BC2 may include a value tag to indicate the version of the contained information as well as a list of the SIBs transmitted on BC2 plus relevant scheduling information. The scheduling information may include some or all scheduling information elements listed for the first and/or second embodiments. Also, new set of information elements may be included.

Figure 4B:
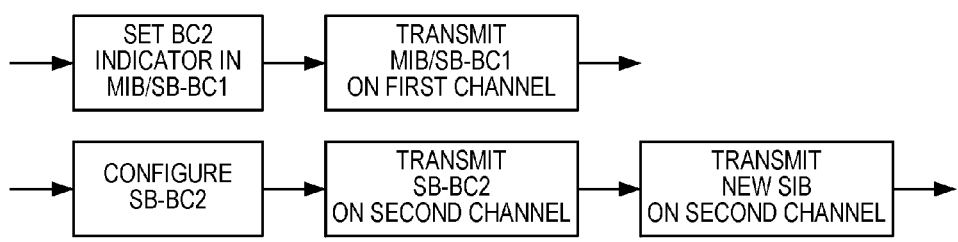

FIG. 4b illustrates an example of a method performed by a network node (e.g., RNC, RBS) to distribute system information using the SIB structure of FIG. 4a. In this third embodiment, the UE will understand whether or not BC2 is supported in the cell based on information transmitted on BC1 (e.g., the "BC2 indicator"). If this indicator is set, the UE may read the new scheduling block SB-BC2 on the second distribution channel. The SB-BC2 may be located on a predetermined position on the BC2. Once the SB-BC2 is acquired, the UE then can find the remaining SIBs on second distribution channel.

Figure 4C:
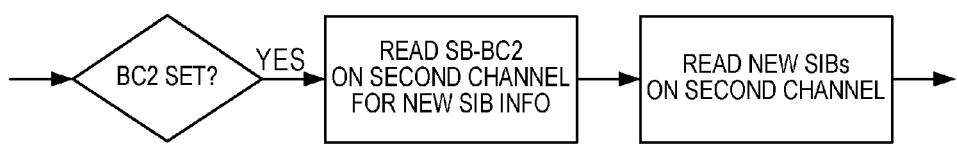

FIG. 4c illustrates an example method performed by the UE to access the SIB of FIG. 4a on a second distributions channel. In this third embodiment, the legacy update mechanisms can be reused to some extent. However, a new SB-BC2 value tag may be included in the Paging Type 1 and System Information Change Indication messages. This value tag may be sent to the UE whenever the content of a BC2 SIB is modified. At reception of the notification (e.g., on PCH, or FACH/HS-DSCH), the UE may check the SB-BC2 and compare the new value tags for the BC2 SIBs with the stored ones. If they differ the UE may reacquire the modified SIB.

Figure 5A:
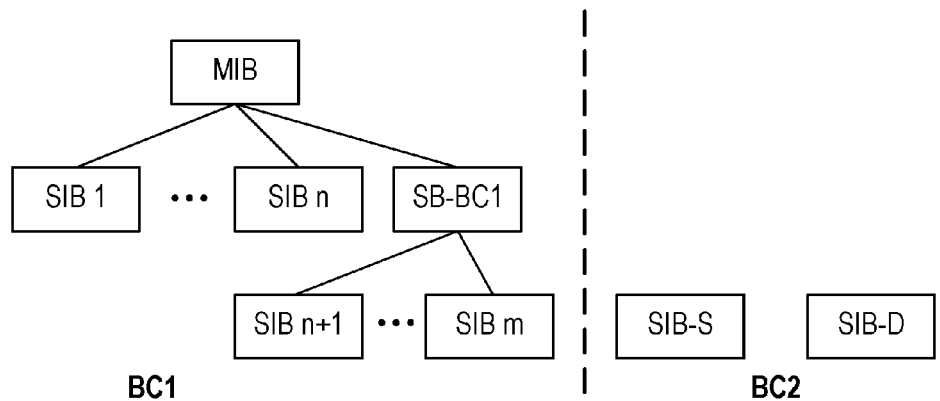
FIG. 5a illustrates an example SIB structure according to a fourth embodiment.

FIG. 5a illustrates an example of a fourth embodiment of the SIB structure. Unlike the first three embodiments, the new system information to be transmitted on BC2 may be grouped into two separate SIBs depending on how frequent the information is changed by the network. As seen, all static information may be provided in one SIB (denoted SIB-S in FIG. 5a) and all dynamic information may be provided in one SIB (denoted SIB-D in FIG. 5a).

The presence of BC2 in the fourth embodiment may be indicated in the MIB or in SB-BC1 on the first distribution channel using the new "BC2 indicator", which is similar to the third embodiment. When BC2 is enabled and the "BC2 indicator" is set, the network node may repeat the static SIB-S on the second distribution channel using a start position and repetition period. One or both of the start position and the repetition period may default to predetermined values. For example, they may be defined by a standard (e.g., 3GPP). In an alternative, the start position and/or the repetition period may be provided in the MIB and/or the SB-BC1. As yet another alternative, there may be default start position and/or repetition period that can be superseded by the values provided in the MIB and/or the SB-BC1.

In addition to the static information, the SIB-S may also include one or both of the following:
  A value tag to indicate the version of the contained information in SIB-S;
  Information about the dynamic SIB-D. For example, the presence and position of SIB-D on the second distribution channel (this is considered to be static information).

Figure 5B:
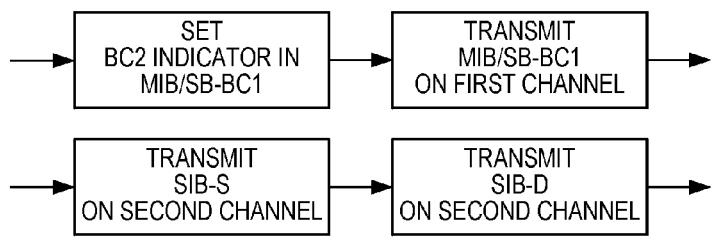

FIG. 5b illustrates an example of a method performed by a network node (e.g., RNC, RBS) to distribute system information using the SIB of FIG. 5a. Grouping all static data in the same SIB implies that the information is transmitted on the broadcast channel using the same repetition period. This can be acceptable since in most cases, there may be little to no benefit in getting a subset of the static BC2 information before the UE has been able to read all legacy information on BC1. Thus, the SIB-S acquisition is not time critical and the repetition period can be set to the largest possible value that matches the time it takes for the UE to read the legacy SIBs on BC1.

Furthermore, when the static information is grouped in the same SIB, the UE reads all SIB segments in order to decode the information, including information related to non-supported features, or other RRC states. However, the SIB-S data is only acquired by the UE when a new cell is entered (and no stored information with matching value tag exists), or when the SIB-S content is changed. Thus, the additional cost to read more information than needed can be neglected.

SIB-D may include all dynamic system information and may be repeated on the second distribution channel with a start position and repetition period. For example, they may be defined by a standard (e.g., 3GPP). In an alternative, the start position and/or the repetition period may be provided in the SIB-S, MIB and/or the SB-BC2. As yet another alternative, there may be default start position and/or repetition period that can be superseded by the values provided in the SIB-S, MIB and/or the SB-BC2.

The content of SIB-D can be associated with one or several expiration timers controlling how often the UE must re-read the information. For example, one subset of the information elements listed in SIB-D can be associated with Expiration timer 1, and another subset of the information elements can be associated with Expiration timer 2. The Expiration timers can be set to different values depending on how frequently the information is changed by the network. Typically the Expiration timer is equal to or longer than the SIB-D repetition period.

The Expiration timers controlling how often the UE must acquire SIB-D information can, for example, be included in either SIB-S (as it can be considered to be static information) or in SIB-D (as the timers must be referenced in SIB-D anyway).

In this third embodiment, the UE will understand whether or not BC2 is supported in the cell based on information transmitted on BC1 (e.g., the "BC2 indicator"). If this indicator is set, the UE may find the static information in SIB-S on a predetermined position on BC2 (standardized or provided in the MIB or SB on BC1). Once the SIB-S is acquired, the UE then can find out whether any dynamic data is broadcasted in the cell, and where this information is scheduled on BC2.

Figure 5C:
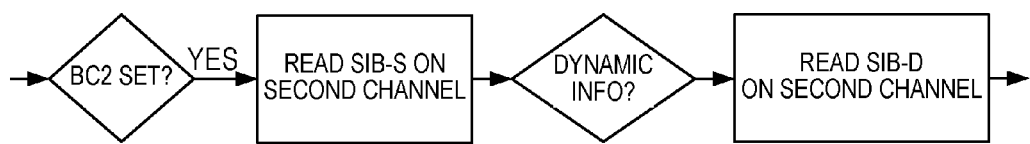

FIG. 5c illustrates an example method performed by the UE to access the SIB-S and SIB-D of FIG. 5a on the second distributions channel. In this fourth embodiment, the legacy update mechanisms can be reused to some extent. However, a new SIB-S value tag may be included in the Paging Type 1 and System Information Change Indication messages. This value tag may be sent to the UE whenever the content of a SIB-S is modified. At reception of the notification (e.g., on PCH, or FACH/HS-DSCH), the UE may read and store a new version of the SIB-S.

Mapping of SIBs to SI Messages

The new SB/SIBs to be transmitted on second distribution channel may be encoded and segmented in the RNC. The RNC may then pass the encoded SB/SIB segments and relevant scheduling information to the RBS, e.g., by using the NBAP procedure System Information Update. RBS may then map the SIB segments to System Information (SI) messages and repeat the information on the channel according to the scheduling information provided by RNC.

New system information may be sent to the RBS only when the SIB is generated the first time (typically when the cell is activated or when a specific SB/SIB is enabled), or when the SB/SIB content is modified.

In one embodiment, the new SIB types on the second channel may be segmented and re-assembled using the existing SIB segmentation protocol, e.g., as specified in [1] where it is possible to concatenate SIB segments and/or complete SIBs from several SIB types in the same SI message. The existing NBAP procedure, e.g., as specified in [2], may be extended with new information to support the transfer of the new BC2 SB/SIB types. In the RBS, the new SB/SIB segments may be mapped to SI messages that are transmitted over the Uu interface, e.g., using the RLC transparent mode. The existing SI message, e.g., as specified in [1], may be reused except for the information element (IE) "SFNprime" (11 bits) that may be omitted when the SI message is sent on the second channel.

In an embodiment, the new SIB types on BC2 may be segmented using a new simplified segmentation protocol as outlined in FIG. 6. This protocol can be optimized for a configuration where no concatenation is allowed and each SI message only contains one SIB Type. It can for example be applied for the fourth embodiment described above where BC2 only contains two SIB types (SIB-S and SIB-D).

After RRC ASN.1 encoding, the SIB may be segmented into equally large segments. For the last segment padding may be added to fill up the transport block size. The RNC may transfer segments and relevant scheduling information to the RBS, e.g., using the existing NBAP procedure System Information Update. RBS may map each segment to one System Information (SI) message that is sent over the Uu interface, e.g., using RLC transparent mode. The SI Message may include a SI header and a payload containing only one SIB segment (first, subsequent or last segment). The SI header may include a fixed length and could contain, but is not limited to, the following information:

SIB ID—identifies the SIB type contained in the SI message. For the fourth SIB structure embodiment, this field may indicate if the SI message includes a SIB-S or a SIB-D segment;

SN—Sequence number for the SIB segment. For example, the first segment of a SIB may have SN=0, the subsequent segment has SN=1, etc. (the starting value of SN may be any number);

L—Indicates if this is the last segment of the SIB (TRUE/FALSE).

Preferably, the size of the payload will match the size of the transport block used to carry the information on the physical layer.

In another embodiment, no segmentation is performed and one complete SIB may be mapped to one SI message. In this instance, the SI message may include a very simple SI header (to inform the UE about the SIB type) and payload.

For all alternatives described above, the UE should be able to store successfully received SI messages even if they are received out of sequence order. When all segments belonging to the same SIB ID have been acquired, i.e., all segments from SN=0 until the last segment indicated by L=TRUE, the UE may assemble the segments in sequential order and decode the complete SIB.

SI Scheduling Alternatives

Predetermined Scheduling:

The above described embodiments, predetermined scheduling of SI messages may be implement in which the exact position is known from the scheduling information (or standardized, e.g., by 3GPP). In predetermined scheduling, a frame structure or a numbering of transmission instants such as SFN or sub frame number may be necessary. If the start position and repetition period is known, the location of the SI message may be given by the formula below:

$$(\text{transmission\_instant} \bmod \text{repetition\_period}) = \text{start\_position}$$

In addition to the predetermined scheduling, the following alternative scheduling options may be considered as well.

Flexible Scheduling:

If the UE must monitor the second distribution until all required system information is received, this could result in unnecessary reading to take place. For information that is not read very often (e.g., static information), this may be acceptable. But this may not be optimal if UEs need to acquire dynamic information more frequently (e.g., dynamic information). In these instances, the network may ensure that all system information is transmitted often enough, i.e., with a predetermined frequency, but apart from that, the network may have full flexibility when this information is transmitted.

Semi-Flexible Scheduling:

In this alternative, the UE is aware of the scheduling window for the SI Message, within which the UE must monitor all potential transmission instants. The network in this case may ensure that the SI messages are transmitted within their respective scheduling windows.

Note that when the scheduling window in the semi-flexible scheduling coincides with the full repetition period of the second distribution channel system information, this is the same as flexible scheduling. In the following semi-flexible scheduling will be referred when going into details, but it should be understood that the same principles could apply even for flexible scheduling.

On-Demand Scheduling:

In this alternative, the system information is not sent periodically on the broadcast channel. Rather, UE may request the information, e.g., when entering a new cell for which the UE has no stored information. This scheduling option makes it possible to use a more aggressive DTX scheme as the information may be sent only when a UE needs it. The UE may request the system information using different means. Examples of such means are described below.

Mapping of SI Messages to Physical Layer

As described above, the higher layers (e.g., Medium Access Control "MAC", Radio Link Control "RLC", and Radio Resource Control "RRC") may segment the system information into a number of SI messages that are to be transmitted at given times or within given time intervals. These SI messages will then have to be mapped to the physical layer and transferred over the Uu interface to the UE. This section outlines alternatives for how this mapping can be done.

Mapping to Common Control Channel:

The Secondary Common Control Physical Channel (S-CCPCH) is a physical channel that in existing standard is used to transfer the FACH and PCH transport channels. One alternative is to use this already specified channel also for SI message distribution. The SI messages would then be mapped to an already existing transport channel such as FACH, PCH or BCH, or to a new defined transport channel. For simplicity, let BC2TrCH denote the transport channel used for this purpose. The BC2TrCH would then be mapped onto the S-CCPCH physical channel.

In a preferred embodiment, an additional S-CCPCH may be allocated to carry the BC2TrCH and no other multiplexed transport channel. However, in other embodiments, it is also possible to multiplex the BC2TrCH with FACH and/or PCH onto an existing S-CCPCH, thereby avoiding the need to setup an additional S-CCPCH just for the purpose of BC2TrCH transmission.

Also in a preferred embodiment, each SI message corresponds to one transport block on the BC2TrCH. In other exemplary embodiments, multiple SI messages may be mapped to one transport block, or one SI message could be mapped to multiple transport blocks.

On the current BCH/P-CCPCH, one transport block of size 246 bits is transmitted every 20 ms TTI. The SI message mapped to the transport block includes an 11 bit long SFN. Since there is no need to transfer the SFN also on the second distribution channel, one embodiment would be to reduce the total SI message size with 11 bits by excluding the SFN bits, and map this to a 246−11=235 bit transport block. This is advantageous in that the available payload in the SI message for SIB data would be unchanged, and hence existing segmentation mechanisms could be employed. Further, the existing one-to-one mapping between a SI message and a transport block may be retained.

Other alternatives would be to actually include the SFN or insert padding in those bits also on second distribution channel, and maintain the entire structure based on the existing 246 bit transport blocks and SI messages.

A restriction on the current BCH/P-CCPCH is that one transport block is transmitted in each TTI. When mapping SI messages onto the S-CCPCH, it is possible to let the BC2TrCH carry more than one transport block per TTI. Assuming a one-to-one mapping between SI messages and transport blocks, this implies transmission on multiple SI messages in one TTI. One benefit with allowing multiple transport blocks per TTI is that the transport block size, and hence SI message size, can be kept small. With smaller SI messages, the need for padding in the higher layer segmentation is reduced.

Further, a longer TTI provides more interleaving benefit on fading channels, and can lead to lower required transmit power to achieve a certain block error rate in the UE's detection of the BC2TrCH. However, with longer TTIs, the number of bits contained in the TTI may increase. By splitting these bits over multiple transport blocks, the benefits with long TTI can be obtained without the drawback of longer transport blocks and more padding. By allowing only a subset of the transport blocks in the TTI to be transmitted, the power used during the TTI will be lower than if all transport blocks were transmitted.

When receiving a BC2TrCH with more than one possible transport block per TTI, the UE can then apply blind transport format detection and attempt to decode the maximum number of transport blocks in one TTI. If only a subset of the possible transport blocks is transmitted, the UE would then detect a CRC error when trying to detect a non-existent transport block. For some segmentation solutions, the UE may be aware of the details of the higher layer segmentation of system information into SI messages (in particular how many SI messages it is expected to receive and sequence numbering of these SI messages or the data contained therein). In these cases, the UE can deduce if the CRC error corresponds to a transmitted (expected) but faulty received transport block, or to a non-transmitted (non-expected) transport block. The UE can also limit its detection attempts to only the expected transport blocks, by employing the knowledge of higher layer segmentation.

In the above paragraph it is assumed that no Transport Format Combination Indicator (TFCI) is transmitted for the BC2TrCH TTIs, and that the UE performs blind detection. However, in an embodiment, it is also possible to include a TFCI and let the UE decode this TFCI and then decode the signaled/detected transport format. However, a drawback with this solution is the additional overhead from the TFCI bits.

A further restriction on the current BCH/P-CCPCH is that one transport block must be transmitted each TTI. This is because the SFN needs to be transmitted every TTI, even if there is no other SI data to be sent. In these cases almost all bits in the 246 bit transport block will be padding bits, which just consume downlink power without conveying additional information to the UE.

But in an embodiment, since the SFN is available to the UE on the legacy channels, there is no need to send the SFN on the second distribution channel. Hence, during time instants (TTIs) where there is no SI information or SFN information, the SI messages need not be transmitted. It would then be beneficial to allow these TTIs to go empty, i.e., the S-CCPCH carrying the BC2TrCH will not transmit any bits/power during these TTIs. To allow this, the BC2TrCH may include a transport format corresponding to no transmitted bits (zero rate), e.g., a transport format with zero transport blocks.

Hence, in its most general form, the BC2TrCH would be defined to have a number of transport formats, including a zero rate transport format. In a preferred embodiment the transport format set would include the following transport formats:

TF_N: N transport blocks, each of size TB_size, where TF_N is the Nth transport format, N=0, 1, . . . max_number_of transport_blocks_in_TTI. It is expected that the transport block size TB_size would be in the range 100-250 bits, but other values are also possible.

It may be necessary for the UE to be aware of the spreading factor and slot format of the channelization code used for S-CCPCH and the channelization code used for S-CCPCH. Either of these may be standardized (e.g., predetermined in the 3GPP specifications) or provided via higher layer signaling on the first distribution channel.

In one preferred embodiment, the BC2TrCH may be mapped to an S-CCPCH using slot format #0. This is a slot format with a predetermined spreading factor (e.g., 256, which provides sufficient bit rate for the second distribution channel while at the same time consuming as little downlink code resources as possible), no pilot bits (P-CCPCH may be used as phase reference as for the existing P-CCPCH) and no TFCI bits (blind transport format detection may be performed by the UE). If a TFCI needs to be supported as well, then a slot format with TFCI bits should be used, such as slot format #2. Yet another solution would be to define a new slot format on S-CCPCH tailor made for the application of carrying the BC2TrCH.

The TTIs on the BC2TrCH/S-CCPCH can be numbered (e.g., using the SFN or CFN), and hence it is possible for higher layers to indicate when in time different SI messages shall be transmitted over the Uu interface.

An S-CCPCH has an offset from the P-CCPCH frame timing, so that a relation between SFN and CFN timing is defined. In a preferred embodiment, this time offset may be set to zero so that the S-CCPCH used for second distribution channel has identical frame timing as P-CCPCH, and CFN and SFN terms denote the same thing. Higher layers may then indicate in which SFNs the SI messages should be transmitted on the Uu interface. For example, if a SI message is to be scheduled at SFN=42, then the corresponding BC2TrCH TTI would be mapped to a number of S-CCPCH radio frames, where the first S-CCPCH radio frame starts during the P-CCPCH radio frame corresponding to SFN=42.

For the common control physical channel (e.g., S-CCPCH) alternative, it may make most sense to let higher layers point out exactly in which TTI the different SI messages are to be transmitted (predetermined scheduling). This is because the BC2TrCH in the preferred embodiment may be mapped to its own radio resources (channelization code), and hence there would be less need to synchronize the activity on this channel with other downlink channels. It is however possible to envision schemes where higher layers provide larger flexibility and the mapping of SI messages to SFNs is more flexible (flexible or semi-flexible scheduling).

Mapping to new physical channel type: In the previous section S-CCPCH was considered as the physical channel carrying BC2TrCH. It should be understood that a new physical channel with similar characteristics as the S-CCPCH may be used instead. If such a channel is defined, it could have slot formats tailor made for the application of carrying BC2TrCH. In its basic form, the slot format may include only data bits (similar to slot format #0 on S-CCPCH). One possible extension would be to let the new physical channel also include bits in the slot format to be used as an indicator of the presence of the second distribution channel. Another possible extension would be to include bits in the slot format to carry the SI distribution in progress flag described below.

Mapping to shared channel: The High Speed Physical Downlink Shared Channel (HS-PDSCH) is a physical channel that in existing standard is used to transfer the HS-DSCH transport channel. One alternative is to use this already specified channel also for SI message distribution. The SI messages would then be mapped to the blocks of the transport channel (e.g., HS-DSCH), and these transport blocks would then be mapped onto the physical channel(s) (e.g., HS-PDSCH).

For the already standardized functionality "HS in CELL_FACH", BCCH/CCCH/DCCH logical channels are mapped to MAC-c Protocol Data Units (PDUs) for transmission on the HS-DSCH. In an embodiment, the MAC-ehs protocol may be used which enables the possibility to send one or several MAC-c PDUs in one transport block, and even to segment one MAC-c PDU into several parts and transmit these parts in different transport blocks (potentially together with other MAC-c PDU segments).

The above HS in CELL_FACH functionality can be reused also for second distribution channel. In a preferred embodiment, each SI message would be mapped to a MAC-c PDU, and these MAC-c PDUs would be forwarded through the MAC-ehs protocol layer to be mapped to transport blocks on the HS-DSCH. In the following, such MAC-c PDUs carrying SI messages are referred to as "SI MAC-c PDUs".

Note that for BC2, there may be no corresponding uplink. Thus, no feedback of ACK/NACK information to HS-DSCH transmissions may be possible. Taking into account that there may be no ACK/NACK feedback, it is possible to have continuous transmission in consecutive TTIs even by using only one Hybrid Automatic Repeat Request (HARQ) process (no need to wait for HARQ ACK/NACK). However, it is also possible to use the concept of multiple HARQ processes (typically 6), in which MAC-ehs PDUs are put for transmission in a specific TTI.

To aid detection of the HS-DSCH/HS-PDSCH, the High Speed Shared Control Channel (HS-SCCH) control channel, which is an example of a shared control channel, has been standardized. By employing the shared control channel, the UE may be made aware of exactly what Transport Format and Resource Combination (TFRC) that is used on the data channel(s) (e.g., HS-PDSCH(s)). These include, among others, the channelization codes used, modulation (e.g., Quadrature Phase Shift Keying "QPSK"/16 Quadrature Amplitude Modulation "16QAM"/64QAM) and transport block size. When a HS-SCCH is used, a masking (scrambling) based on the HS-DSCH Radio Network Temporary Identifier (H-RNTI) is applied to the HS-SCCH, so that only UEs using this specific H-RNTI in its HS-SCCH detection will be able to decode the HS-SCCH. There is also some possibility to run without HS-SCCH, so called HS-SCCH-less operation, in which the UE tries to detect the HS-PDSCH directly (blindly, without detailed information about the used TFRC). To enable this, the UE may be informed in advance of a limited subset of used TFRCs, which the UE then can try to detect blindly.

In one embodiment, the SI MAC-c PDUs may be transmitted on the data channel (e.g., HS-DSCH) with an accompanying HS-SCCH. In this case, it may be necessary for the UEs listening for BC2 to know which HS-SCCH messages are associated with BC2. In one preferred embodiment, this can be achieved by allocating a separate H-RNTI for the BC2 information. This H-RNTI can be defined already in the specifications (hard-coded) or signaled to the UE on the BC1. This H-RNTI could be common for all (or a group of) UEs or be UE specific. UEs in the process of receiving SI on BC2 would then listen for the shared control channel (e.g., HS-SCCH) messages addressed to this specific H-RNTI. When the shared control channel message is detected, the UE then may proceed to detect the HS-DSCH carrying the SI MAC-c PDUs.

A drawback with using an HS-SCCH associated with BC2 is that the power required for the HS-SCCH to cover the entire cell can be rather high. Hence, in another embodiment, the SI MAC-c PDUs may be transmitted on HS-DSCH without any accompanying HS-SCCH. In this case, only a small subset (a predetermined number) of allowed TFRCs may be used for transmission. This subset can be defined already in the specifications (hard-coded), or signaled to the UE on the BC1.

In yet another embodiment, a new control channel (e.g., new HS-SCCH type) may be introduced for conveying BC2 information. This new control channel type (which may be a shared type) may be tailored for SI MAC-c PDUs and designed to consume as little power as possible. For example, only a few (predetermined number of) TFRCs may be supported, a fixed modulation and a fixed number of codes. Also, various coverage enhancement features, such as repetition could be employed.

A benefit with mapping SI messages to a data channel (e.g., HS-PDSCH) is that different transport formats can be used depending on available resources (power, HS-PDSCH codes) and amount of system information to broadcast. This is especially true for the case of flexible or semi-flexible scheduling, where the distribution of SI messages can be steered towards TTIs where there are more available resources (e.g., no other data to be transmitted to any UE in these TTIs).

For the case of predetermined scheduling, each SI MAC-c PDU may be associated with a specific transmission time when the PDU shall be transmitted over the Uu interface. This transmission time may be related to the SFN and subframe number of the HS-PDSCH. Hence, within the priority queue (PQ) associated with these PDUs, the MAC-c PDUs will have an associated transmission time when PDUs need to be transmitted. The scheduler may then need to ensure that priority is given to the PQ with SI MAC-c PDU with a transmission time that corresponds to the TTI to be scheduled.

For the case of flexible or semi-flexible scheduling, each SI MAC-c PDU may be associated with a specific transmission time window when the PDU shall be transmitted over the Uu interface. Hence, within the PQ associated with these PDUs, the MAC-c PDUs may have an associated transmission time window when PDUs need to be transmitted. The scheduler may then need to ensure that priority is given to the PQ with SI MAC-c PDU to meet the transmission window requirement. One example of such an HS scheduler is to let data in SI MAC-c PQs have rather low priority until the end of the allowed scheduling window is approaching, when the priority is increased to ensure that the data will be scheduled within its allowed window.

For any broadcast information, it is important that all UEs in the cell can be reached. Since the TTI is so short on HS-PDSCH, the bit rate transmitted in a TTI can be quite substantial, even if small transport blocks are used. This can cause problems with coverage, since in general the higher the bitrate, the worse the coverage is.

To increase the coverage, autonomous retransmissions (i.e., retransmissions not triggered by any NACK feedback) together with soft combining of the transmissions in the UE can be utilized. In its simplest form, the UE may be informed that a certain amount of autonomous retransmissions are applied, e.g., data that is addressed to TTI X will be repeated in TTIs X+1, X+2, X+3. Another alternative is to send repetitions in each 6th TTI if the UE is using 6 HARQ processes. If the UE knows in advance what autonomous retransmissions that are applied, then soft combining can be applied even if no HS-SCCH is transmitted. If HS-SCCH is transmitted, the UE may know from the new data indicator of the HS-SCCH information if the transmission is a new transmission or is to be soft combined with some earlier transmission(s). The retransmissions can be done either using chase combining or incremental redundancy. However, to really benefit in coverage, the UE may soft combine as many transmissions as possible to arrive at decoding where the CRC check is successful.

To reduce the HS-SCCH overhead when using autonomous retransmissions, it is possible to include a HS-SCCH only with the first transmission and then use the same TFRC for the first transmission as well as all retransmissions. If the UE has knowledge in advance of when the retransmissions will occur, it can then use the knowledge that the TFRC signaled in the single HS-SCCH detected applies for multiple known TTIs, which the UE then can soft combine.

On-Demand SI Distribution

The system information can be divided into static parts that remain unchanged over long times, and dynamic parts that are updated quite frequently. See fourth SIB embodiment above. In practice, the UE will need to read static SI quite seldom, typically when entering cells the UE has not been in recently (UEs typically remember the SI from cells it has recently visited, to avoid having to read the SI again when returning to the cell). In order to save downlink capacity, one idea is to not continuously distribute the static SI, but instead only distribute it when a UE requests it (referred to as on-demand SI distribution). This can avoid the continuous transmission of information that no UE is listening to, which is a waste of resources.

When the UE needs to read SI that is distributed on demand, the UE may send an SI distribution request on the uplink. In one preferred embodiment, this message may be transmitted on the Random Access Channel (RACH) channel, in another preferred embodiment this message is transmitted on the E-DCH channel. Preferably, the SI distribution request is terminated by the RBS, since the RBS is in charge of system information distribution, and a fast response to the request is preferred. This implies that preferably the SI distribution request will not be forwarded to the RNC, as would normal RACH/E-DCH data. However, forwarding the request to the RNC and make the RNC responsible for the response is still possible, albeit less preferred alternative.

The SI distribution request can be a specific preamble, using a specific signature and/or access slot. In that case, the existence of such a preamble is an indication that this is a SI distribution request. An optional RACH/E-DCH message can follow as described in the following.

Another possibility is to let the SI distribution request be part of the RACH/E-DCH message payload.

When RACH is used, the MAC PDU transferred in the RACH transport block has the form outlined in FIG. 7 and FIG. 8. In one preferred embodiment, the two first bits in the detected RACH message transport block may be used to convey a SI distribution request. These two bits contain the TCTF field of the MAC header, and in current specifications only values 00 and 01 are used. A value 10 or 11 could be used to indicate that the message is a SI distribution request message. This would enable the RBS to quickly detect a SI distribution request without having to unwrap several protocol layers to find a signaling message on RRC-level.

Figure 9:
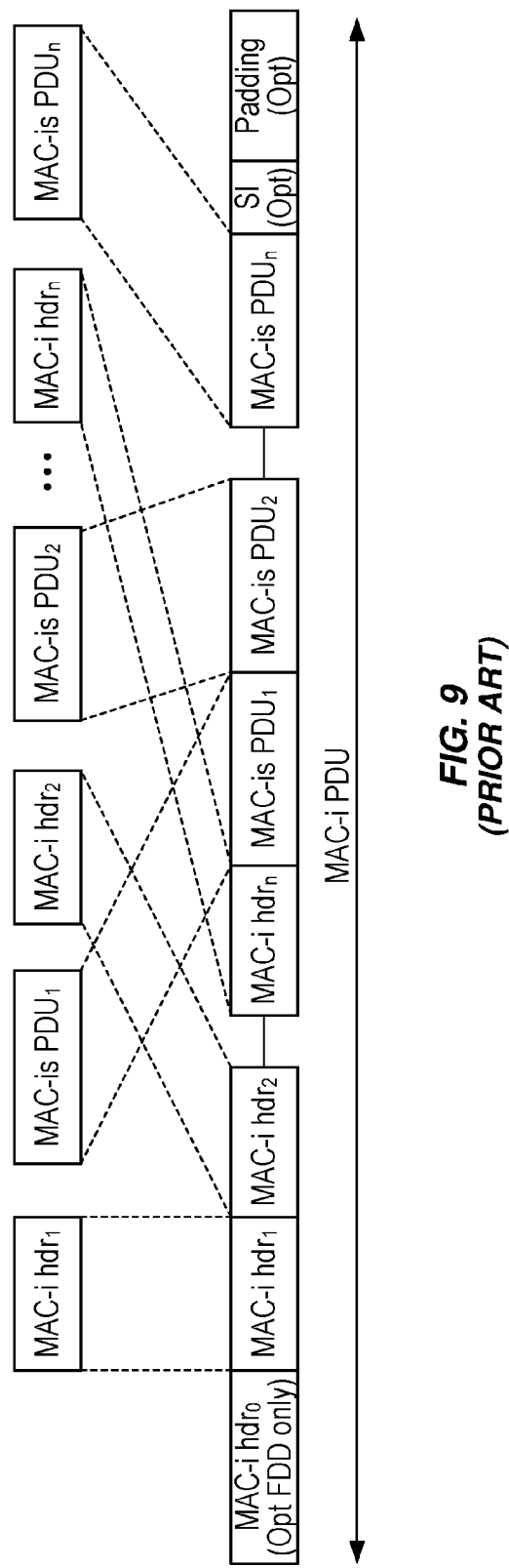
FIG. 9 illustrates an example MAC-i PDU.

When E-DCH is used, the MAC-i PDUs transferred in the E-DCH transport block has the form outlined in FIGS. 9-11. In particular, in the MAC-i header 0, the first four bits may be set to a predetermined value, e.g., 1111. Following these bits is a spare field of four bits (which should be set to a predetermined value, e.g., 0000, in current 3GPP releases), and then follows an E-RNTI field.

In one embodiment, a MAC-i header 0 may be used with a value other than 0000 in the spare field to indicate a SI distribution request. In another embodiment, a value different than 0000 in the spare bits may be used to indicate that the subsequent bits do not include an E-RNTI, but rather includes an SI distribution request. This would enable the RBS to quickly detect a SI distribution request by just identifying bits 1111xxxx (where xxxx is different from 0000) in the beginning of the transport block, hence eliminating the need to unwrap several protocol layers to find a signaling message on RRC-level.

In its simplest form, the SI distribution request message may be implemented as a simple flag indicating that all on-demand SIs are requested.

In more advanced forms, the request can be more specific, requesting a set of SIs, where these SIs can correspond e.g., to a subset of SIBs ("SIB33 and SIB42 but no other SIBs") or different specific parts of the SIB-S. In the more advanced form, several bits of information may need to be transmitted on uplink. In one exemplary embodiment these bits indicating which set of SIs that are requested may follow directly after the TCTF field in the MAC header on RACH. In other exemplary embodiments, these bits indicating which set of SBs that are requested may follow in the four spare bits directly after the 4-bit LCH-IDO field in the MAC-i header 0 on E-DCH, or in the bits directly after the 4-bit LCH-IDO field and 4-bit spare field in the MAC-i header 0 on E-DCH.

In another embodiment, when a specific signature/access slot is used for SI distribution request, the actual RACH/E-DCH message part can include the required bits that indicate which set of SIs that are requested. In this case, the RBS may decode the transport block, check the CRC and if CRC is ok then assume this is a valid SI distribution request and then interpret the different bits in the decoded message as flags for which set of SIs that have been requested.

A special case may be to just let CRC-OK lead the RBS to retransmit all on-demand SI. This can be useful if detection of a specific signature/access slot is prone to false alarm, and a sanity check is performed on the message part. If the correct preamble is detected, the RBS may proceed to decode the RACH/E-DCH message part transport block according to the predefined format. For example, the message can be just a CRC appended to zero information bits. In the case a specific preamble is used for SI distribution requests, the role of the specific preamble may be to trigger the RBS to attempt to detect a message part that may differ in format from the normal RACH/E-DCH. The SI distribution request may be decoded and understood by the RBS, while in the case of a normal RACH/E-DCH transmission, the transport block contents may be forwarded to RNC for further unwrapping of protocol layers.

One potential issue with UEs sending SI distribution requests is that many UEs can request that same SI information at the same time, causing a high uplink load. As an illustration, consider a case of a train with many UEs arriving into a new cell. All UEs on that train would like to read SI for the new cell.

In order to avoid this unnecessary uplink load, the RBS can, according to one embodiment, be given the possibility to block UEs from sending SI distribution requests. This can be accomplished by introducing an RBS controlled flag in the downlink denoted as SI distribution in progress flag. In this embodiment, the UE may be required to read the SI distribution in progress flag before attempting to send the SI distribution request. If the flag indicates that SI distribution is in progress, the UE may be required to refrain from sending the SI distribution request.

In the train scenario, the first UE to send a SI distribution request may trigger the RBS to block further SI distribution requests using the SI distribution in progress flag. There may be a short time between the first UE's request before the flag is updated on the downlink and read by all other UEs. Hence, during a short transition time there may be several SI distribution requests, but many UEs will be blocked from loading the uplink with useless requests (the RBS will anyway start to distribute the requested SI) (see FIG. 12).

Hence, in this embodiment, as soon as a UE is missing SIB information because it has never been read or the value tag has changed, the UE may be required to first monitor the SI distribution in progress flag, and if SI distribution is not already in progress (or soon to start), the UE then may send its SI distribution request.

FIG. 12 indicates one repetition of the SI after reception of the SI distribution request, and that the SI distribution in progress flag is cleared after all repetitions of requested SIs are finished. It is also possible to envision that the flag should be cleared as soon as the last transmission of a particular SI part is finished, to enable UEs that missed the earlier parts (that will not be repeated) to request them as soon as possible.

Figure 13:
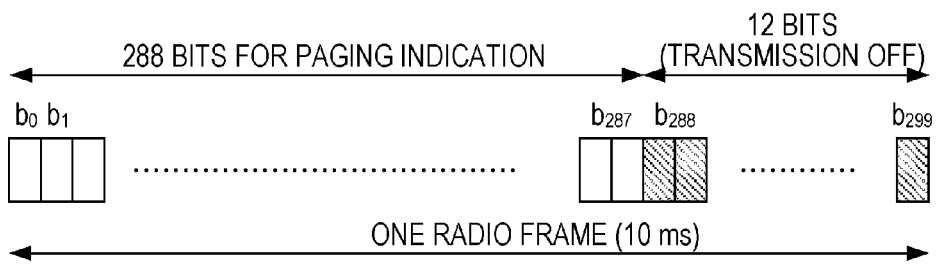
FIG. 13 illustrates an example PICH channel structure.

There are multiple possibilities for how to send the SI distribution in progress flag over the Uu interface. In a preferred embodiment, the currently unused bits on an already existing channel such as the Paging Indicator Channel (PICH) or Acquisition Indicator Channel (AICH). A PICH radio frame is 10 ms long and contains 300 bits. However, only the first 288 are used for paging information. The SI distribution in progress flag can be mapped on the remaining 12 bits (or some parts thereof), for example with simple repetition coding of one bit of information (see FIG. 13).

Figure 14:
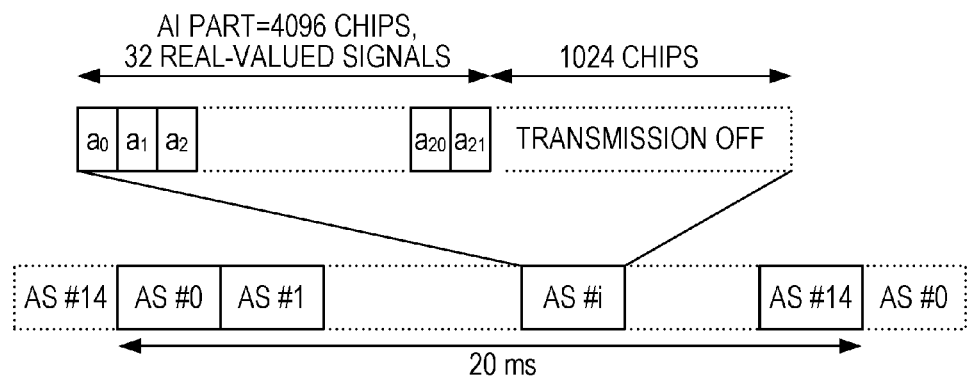
FIG. 14 illustrates an example AICH channel structure.

An AICH access slot is 20/15 ms long, where only the first 4096 chips are used to transmit AIs. The remaining 1024 chips (or some parts thereof) of the access slot could house the SI distribution in progress flag (see FIG. 14).

Figure 15:
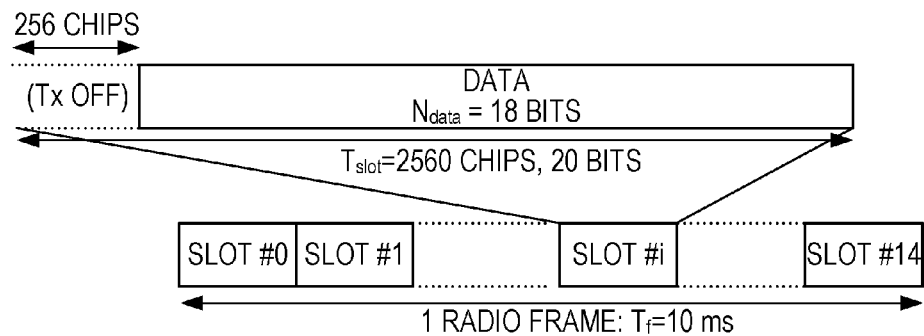
FIG. 15 illustrates an example P-CCPCH frame structure.

Yet another embodiment would be to use the DTX-parts of the P-CCPCH to carry the flag. A P-CCPCH slot is 2560 chips long, but out of these, the first 256 chips are currently not transmitted, and can house 2 bits of information. The SI distribution in progress flag can be mapped to these bits in one or several slots (see FIG. 15).

If the SI distribution request message is in the form of a single flag indicating that all on-demand SIs are requested, the SI distribution in progress flag needs to only be one bit. In more advanced forms, when the request can be more specific, requesting a set of SIs, a more advanced SI distribution in progress flag may be required. In this case, multiple bits indicating which set of SIs that are being distributed may be necessary. Hence, in these cases, multiple bits may be put on the downlink physical channel used for the flag(s). It is possible to first map the combination of flags per set of SIs to different code words, and then map these code words on the physical channel bits.

Another possibility (and embodiment) is to let a multi-bit SI distribution in progress flag provide information of the number of remaining repetitions of the ongoing SI distribution. In its most elaborate form, this advanced flag may indicate exactly the remaining number of repetitions. A simpler version could be that the advanced flag indicates whether multiple or a single repetition remain (e.g., one out of 'multiple repetitions left' and 'only the last repetition left'). Yet another option could be that the multi-bit flag also could indicate zero repetitions left, in case the last repetition has already started.

In certain scenarios (e.g., cells with high amount of mobility), it may be beneficial to refrain from using the on-demand SI distribution. One alternative is to indicate on the first distribution channel (e.g., in the MIB) whether or not the on-demand SI distribution may be used on the second distribution channel. If on-demand SI distribution is not configured, then no power in downlink will have to be allocated to carry the SI distribution in progress flag, and there will be no additional uplink load from SI distribution requests.

If the second distribution channel is configured to use on-demand SI distribution, it is possible to avoid the uplink load from requests by continuously distributing the SI information and continuously sending a SI distribution in progress flag that indicates that SI distribution is in progress. This in effect disables the on-demand SI distribution mechanism.

When second distribution channel is configured to use on-demand SI distribution, it is even possible to adapt the distribution dynamically to the current situation in the cell.

The behavior can e.g., be connected to the cell load in uplink and downlink. If uplink is currently the limiting link, the RBS can disable on-demand SI distribution according to the method in the previous paragraphs. If downlink is the limiting link, it may be more important to not suffer from any unnecessary SI distribution, and then the RBS may employ on-demand SI distribution in the normal way (as shown in FIG. 12 above).

Figure 16:
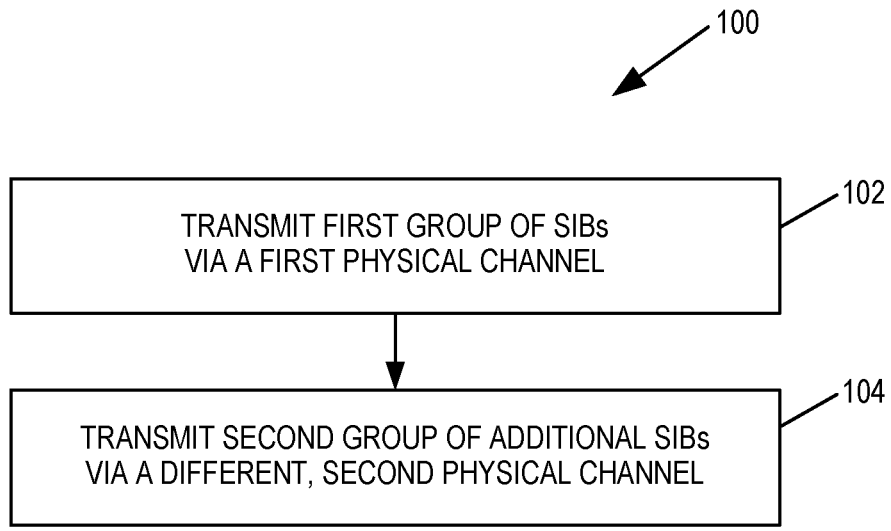
FIG. 16 illustrates an example method implemented by a network node for transmitting system information to a plurality of wireless terminals.

FIG. 16 illustrates an example method 100 implemented by a network node in a wireless communication network of transmitting system information to a plurality of wireless terminals. According to the method 100, the network node transmits a first group of SIBs via a first physical channel (block 102), and transmits a second group of additional SIBs via a different, second physical channel (block 104).

In one or more embodiments, the first physical channel is configured to be read by a first group of wireless terminals and also by a different, second group of wireless terminals (e.g., the "legacy distribution channel" discussed above), and the second physical channel is configured to be read by only one of the first and second group of wireless terminals (e.g., the "extended distribution channel" discussed above). In one example, the first physical channel is the P-CCPCH, and the second physical channel is one of the S-CCPCH and the HS-PDSCH.

In one or more embodiments, the method 100 also includes the network node transmitting, via the first physical channel, scheduling information for reception of the additional SIBs on the second physical channel (see, e.g., FIG. 2*a*). The scheduling information may be included in a scheduling block transmitted via the first physical channel (e.g., SB-BC1 in FIG. 2*a*).

In one or more embodiments, the method 100 also includes the network node transmitting, via the second physical channel, scheduling information for reception of the additional SIBs (e.g., SB-BC2 in FIGS. 3*a* and 4*a*), and also transmitting, via the first physical channel, either additional scheduling information for reception of the additional SIBs (e.g., SB-BC1 in FIG. 3*a*) or an indication that the additional SIBs are going to be transmitted via the second physical channel (as described above in connection with FIG. 4*a*).

In one or more of the embodiments discussed above, transmitting the second group of additional SIBs via the second physical channel (block 104) includes transmitting, via the second physical channel, one or more first SIBs that only include static system information (e.g., SIB-S in FIG. 5*a*), and transmitting, via the second physical channel, one or more second SIBs that only include dynamic system information (e.g., SIB-D in FIG. 5*a*).

In one example, the one or more first SIBs that only include static system information are transmitted according to a first repetition period, and the one or more second SIBs that only include dynamic system information are transmitted according to a different, second repetition period.

In the same or another example, the one or more first SIBs comprise a single first SIB that includes all static system information (e.g., SIB-S in FIG. 5*a*), and the one or more second SIBs comprise a single second SIB that includes all dynamic system information (e.g., SIB-D in FIG. 5*a*).

In one or more embodiments, the method 100 also includes performing load balancing between the first and second physical channels by including a SIB from the first group of SIBs in the second group of additional SIBs.

Figure 17:
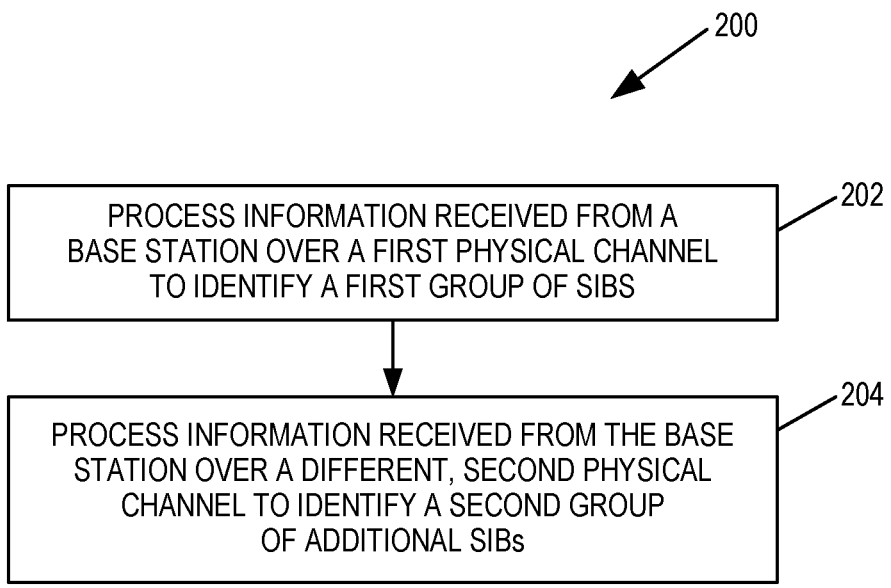
FIG. 17 illustrates an example method implemented by a wireless terminal for processing system information received over different physical channels.

FIG. 17 illustrates an example method 200 implemented by a wireless terminal in a wireless communication network of processing system information. According to the method 200, the wireless terminal processes information received from a base station over a first physical channel to identify a first group of system information blocks (SIBs) (block 202), and also processes information received from the base station over a different, second physical channel to identify a second group of additional SIBs (block 204).

In one or more embodiments, the first physical channel is configured to be read by a first group of wireless terminals and also by a different, second group of wireless terminals (e.g., the "legacy distribution channel" discussed above), and the second physical channel is configured to be read by only the second group of wireless terminals (e.g., the "extended distribution channel" discussed above). In such embodiments, the wireless terminal is part of the second group of wireless terminals. In one example, the first physical channel is the P-CCPCH, and the second physical channel is one of the S-CCPCH and the HS-PDSCH.

In one or more embodiments, the wireless terminal identifies the second group of additional SIBs based on processing information received from the base station over the first physical channel to identify scheduling information for reception of the additional SIBs on the second physical channel (see, e.g., FIGS. 2*a* and 3*a*).

In one or more embodiments, the method 200 also includes the wireless terminal processing information received from the base station over the second physical channel to identify scheduling information for reception of the additional SIBs (e.g., SB-BC2 in FIGS. 3*a* and 4*a*). In these embodiments, the method also includes processing information received from the base station over the first physical channel to identify either additional scheduling information for reception of the additional SIBs (e.g., SB-BC1 in FIG. 3*a*) or an indication that the additional SIBs are going to be transmitted via the second physical channel (as described above in connection with FIG. 4*a*).

In one or more embodiments, the processing of information received from the base station over the second physical channel to identify the second group of additional SIBs (block 204) includes identifying, from the information received over the second physical channel, one or more first SIBs that only include static system information (e.g., SIB-S in FIG. 5*a*), and identifying, from the information received over the second physical channel, one or more second SIBs that only include dynamic system information (e.g., SIB-D in FIG. 5*a*).

In one example, the one or more first SIBs that only include static system information are received according to a first repetition period, wherein the one or more second SIBs that only include dynamic system information are received according to a different, second repetition period.

In the same or another example, the one or more first SIBs comprises a single first SIB that includes all static system information (e.g., SIB-S in FIG. 5*a*), and the one or more second SIBs comprises a single second SIB that includes all dynamic system information (e.g., SIB-D in FIG. 5*a*).

Nodes and Terminals

The methods illustrated above may be performed by one or more network nodes and/or wireless terminals. The network node can be a RNC or RBS. Of course, these are merely examples of network nodes and should be not taken in a limiting sense.

Figure 18A:
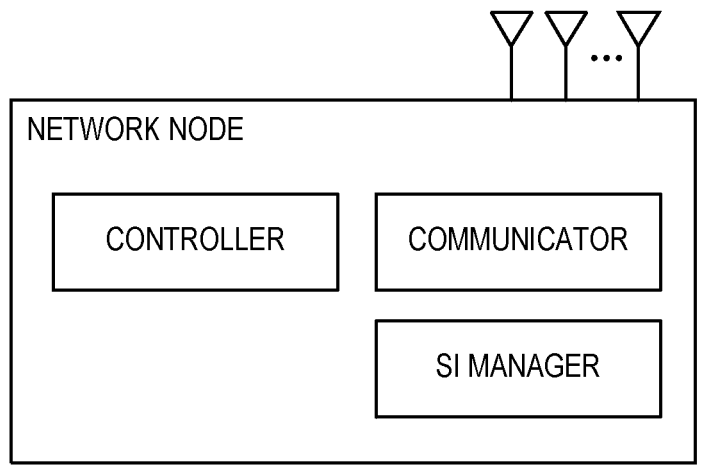
FIG. 18a illustrates the main functional elements of an example network node capable of distributing system information using one or more of the techniques described above.

FIG. 18*a* illustrates an embodiment of a network node capable of distributing system information utilizing legacy and extended distribution channels according to one or more of the techniques described above. The example network node may include a controller, a communicator and a SI (system information) manager. The communicator may be structured to perform radio communications with wireless terminals via one or more antennas. The communicator may also be structured to perform wired and/or wireless communication with other network nodes. The SI manager may be structured to manage system information and to transmit, via the communicator, system related information (e.g., MIB, SB-BC1, SB-BC2, SIBs, SIB-S, SIB-D, etc.) to one or more wireless terminals. The SI manager may also respond to SI related requests from the wireless terminals. The controller may be structured to control the overall operation of the network node.

FIG. 18a provides a logical view of the network node and the components included therein. It is not strictly necessary that each component be implemented as physically separate modules. Some or all components may be combined in a physical module.

Figure 18B:
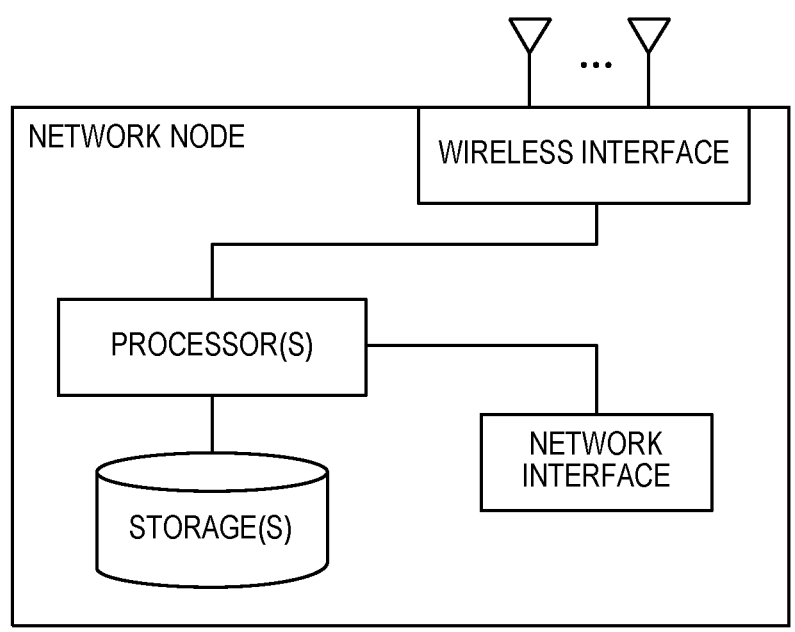

Also, the components of the network node need not be implemented strictly in hardware. It is envisioned that the components can be implemented through any combination of hardware and software. For example, as illustrated in FIG. 18b, the network node may include one or more hardware processors, one or more storages (internal, external, both), and one or both of a wireless interface (in case of a radio node) and a network interface.

The processor(s) may be configured to execute program instructions to perform the functions of one or more of the network node components. The instructions may be stored in a non-transitory storage medium or in firmware (e.g., ROM, RAM, Flash) (denoted as storage(s)).

Note that the program instructions may also be received through wired and/or or wireless transitory medium via one or both of the wireless and network interfaces. The wireless interface (e.g., a transceiver) may be configured to receive signals from and send signals to wireless terminals via one or more antennas. The network interface may be included and configured to communicate with other network nodes.

Figure 19A:
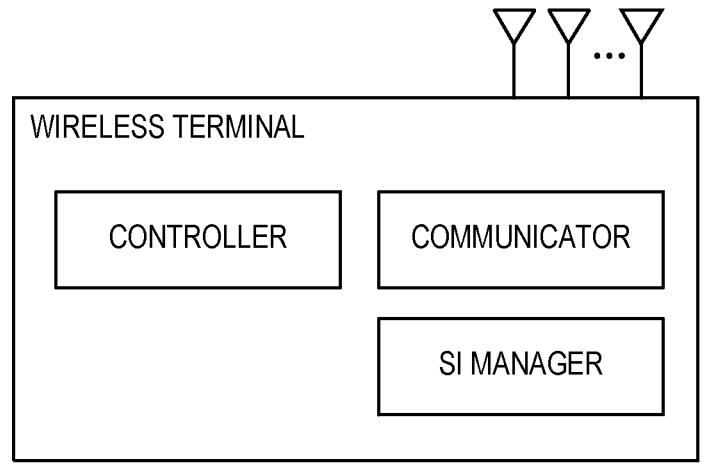
FIG. 19a illustrates the main function elements of an example wireless terminal capable of processing system information using one or more of the techniques described above.

FIG. 19a illustrates an example embodiment of a wireless terminal capable of processing system information according to one or more of the techniques described above. The wireless terminal of FIG. 19a includes a controller, a communicator and a SI manager. The communicator may be structured to perform radio communications with other radio nodes such as RBS. The SI manager may be structured to receive, via the communicator, SI related information. The SI manager may also request the network node for SI related information. The controller may be structured to control the overall operation of the network node.

Figure 19B:
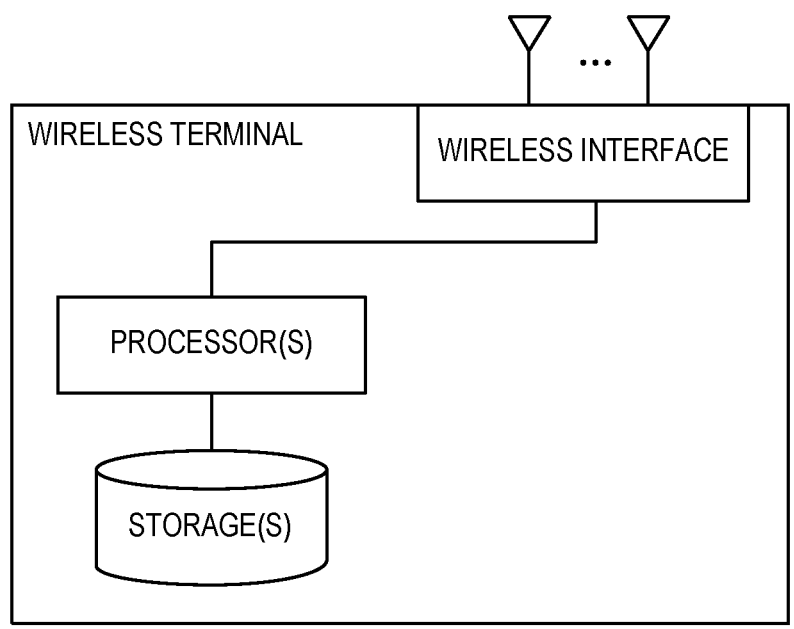

As illustrated in FIG. 19b, the wireless terminal may include one or more hardware processors, one or more storages, and a wireless interface. The processor(s) may be configured to execute program instructions to perform the functions of one or more of the network node components. The instructions may be stored in a non-transitory storage medium or in firmware (e.g., ROM, RAM, Flash) (denoted as storage(s)). Note that the program instructions may also be received through wired and/or or wireless transitory medium via one or both of the wireless and network interfaces. The wireless interface (e.g., a transceiver) may be configured to receive signals from and send signals to wireless terminals via one or more antennas.

One significant advantage (among others) of using the extended system information distribution mechanism is that the system information capacity is increased while maintaining backwards compatibility for existing UEs.

As discussed above, in one or more aspects, a plurality of channels may be used to distribute system information. One or more of these distribution channels may be used to maintain backwards compatibility. Also, one or more distribution channels may be used to extend the system information distribution.

Some or all aspects of the disclosed subject matter may be applicable in a wireless network comprising one or more network nodes (e.g., RNC, RBS). An aspect of the disclosed subject matter may be directed to one or more methods performed by a network node. For example, the network may:

transmit MIB/SB (which may include information of SIBs) over a legacy distribution channel, and transmit corresponding SIBs over an extended distribution channel;

transmit MIB/SB (which may include information of SBs) over a legacy distribution channel, transmit corresponding SBs (which may include information of SIBs) over an extended distribution channel, and transmit corresponding SIBs over the extended distribution channel;

transmit MIB/SB (which may include an indication that extended SI information is available) over a legacy distribution channel, transmit SB (which may include information of SIBs) over an extended distribution channel, and transmit corresponding SIBs over the extended distribution channel;

transmit MIB/SB (which may include an indication that extended SI information is available) over a legacy distribution channel, transmit SIB-S (which may include static information) over an extended distribution channel, and transmit SIB-D (which may include dynamic information) over the extended distribution channel.

Another aspect of the disclosed subject matter may be directed to program instructions which when executed by a computer of a network node, causes the network node to perform the method as described above. The program instructions may be received through a transitory medium and executed directly therefrom. The program instructions may also be stored in a non-transitory storage medium and the network node may read the program instructions therefrom.

Another aspect of the disclosed subject matter may be directed to one or more methods performed by a wireless terminal in a wireless network to receive SIBs. For example, the wireless terminal may:

read/decode MIB/SB (which may include information of SIBs) received over a legacy distribution channel, and read/decode corresponding SIBs received over an extended distribution channel;

read/decode MIB/SB (which may include information of SBs) received over a legacy distribution channel, read/decode corresponding SBs (which may include information of SIBs) received over an extended distribution channel, and read/decode corresponding SIBs received over the extended distribution channel;

read/decode MIB/SB (which may include an indication that extended SI information is available) received over a legacy distribution channel, read/decode SB (which may include information of SIBs) received over an extended distribution channel, and read/decode corresponding SIBs received over the extended distribution channel;

read/decode MIB/SB (which may include an indication that extended SI information is available) received over a legacy distribution channel, read/decode SIB-S (which may include static information) received over an extended distribution channel, and read/decode SIB-D (which may include dynamic information) received over the extended distribution channel.

Another aspect of the disclosed subject matter may be directed to program instructions which when executed by a computer of a wireless terminal, causes the wireless terminal to perform the method as described above. The program instructions may be received through a transitory medium and executed directly therefrom. The program instructions may also be stored in a non-transitory storage medium and the network node may read the program instructions therefrom.

The present disclosure may, of course, be carried out in other ways than those specifically set forth herein without departing from essential characteristics of the disclosure. The present embodiments are to be considered in all respects as illustrative and not restrictive, and all changes coming within the meaning and equivalency range of the appended claims are intended to be embraced therein.

What is claimed is:

1. A method implemented by a network node in a wireless communication network of transmitting system information to a plurality of wireless terminals, the method comprising:
   transmitting a first group of system information blocks (SIBs) via a first physical channel; and
   transmitting a second group of additional SIBs via a different, second physical channel, wherein transmitting the second group of additional SIBs via the second physical channel comprises:
      transmitting, via the second physical channel according to a first repetition period, one or more first SIBs that only include static system information; and
      transmitting, via the second physical channel according to a different, second repetition period, one or more second SIBs that only include dynamic system information.

2. The method of claim 1:
   wherein the first physical channel is configured to be read by a first group of wireless terminals and also by a different, second group of wireless terminals; and
   wherein the second physical channel is configured to be read by only one of the first and second group of wireless terminals.

3. The method of any claim 1, further comprising:
   transmitting, via the first physical channel, scheduling information for reception of the additional SIBs on the second physical channel.

4. The method of claim 1, further comprising:
   transmitting, via the second physical channel, scheduling information for reception of the additional SIBs; and
   transmitting, via the first physical channel, either additional scheduling information for reception of the additional SIBs or an indication that the additional SIBs are going to be transmitted via the second physical channel.

5. The method of claim 1:
   wherein the one or more first SIBs comprises a single first SIB that includes all static system information; and
   wherein the one or more second SIBs comprises a single second SIB that includes all dynamic system information.

6. The method of claim 1, further comprising:
   performing load balancing between the first and second physical channels by including a SIB from the first group of SIBs in the second group of additional SIBs.

7. The method of claim 1:
   wherein the first physical channel is a Primary Common Control Physical Channel (P-CCPCH); and
   wherein the second physical channel is one of a Secondary Common Control Physical Channel (S-CCPCH) and a High Speed Physical Downlink Shared Channel (HS-PDSCH).

8. A network node comprising:
   a transceiver; and
   one or more processing circuits configured to utilize the transceiver to implement the method of claim 1.

9. A method implemented by a wireless terminal in a wireless communication network, the method comprising:
   processing information received from a base station over a first physical channel to identify a first group of system information blocks (SIBs);
   processing information received from the base station over a different, second physical channel to identify a second group of additional SIBs, wherein processing information received from the base station over the second physical channel to identify the second group of additional SIBs is characterized by:
      identifying, from the information received over the second physical channel, one or more first SIBs that only include static system information, wherein the one or more first SIBs that only include static system information are received according to a first repetition period; and
      identifying, from the information received over the second physical channel, one or more second SIBs that only include dynamic system information, wherein the one or more second SIBs that only include dynamic system information are received according to a different, second repetition period.

10. The method of claim 9:
    wherein the first physical channel is configured to be read by a first group of wireless terminals and also by a different, second group of wireless terminals;
    wherein the second physical channel is configured to be read by only the second group of wireless terminals; and
    wherein the wireless terminal is part of the second group of wireless terminals.

11. The method of claim 9, wherein identification of the second group of additional SIBs is based on:
    processing information received from the base station over the first physical channel to identify scheduling information for reception of the additional SIBs on the second physical channel.

12. The method of claim 9, further comprising:
    processing information received from the base station over the second physical channel to identify scheduling information for reception of the additional SIBs; and
    processing information received from the base station over the first physical channel to identify either additional scheduling information for reception of the additional SIBs or an indication that the additional SIBs are going to be transmitted via the second physical channel.

13. The method of claim 9:
    wherein the one or more first SIBs comprises a single first SIB that includes all static system information; and
    wherein the one or more second SIBs comprises a single second SIB that includes all dynamic system information.

14. The method of claim 9:
    wherein the first physical channel is a Primary Common Control Physical Channel (P-CCPCH); and wherein the second physical channel is one of a Secondary Common Control Physical Channel (S-CCPCH) and a High Speed Physical Downlink Shared Channel (HS-PDSCH).

15. A wireless terminal comprising:
a transceiver; and
one or more processing circuits configured to utilize the transceiver to implement the method of claim 9.

\* \* \* \* \*

UNITED STATES PATENT AND TRADEMARK OFFICE
CERTIFICATE OF CORRECTION

PATENT NO. : 9,967,805 B2
APPLICATION NO. : 14/768250
DATED : May 8, 2018
INVENTOR(S) : Brismar et al.

Page 1 of 1

It is certified that error appears in the above-identified patent and that said Letters Patent is hereby corrected as shown below:

In the Drawings

In Fig. 7, Sheet 6 of 12, delete " MAC SDU " and insert -- MAC PDU --, therefor.

In Fig. 17, Sheet 10 of 12, for Block "202", in Line 3, delete "SIBS" and insert -- SIBs --, therefor.

In the Specification

In Column 1, Lines 4-8, delete "RELATED APPLICATIONS
This application claims the benefit of provisional Application No. 61/769,037, filed on
Feb. 25, 2013, the disclosure of which is incorporated herein by reference in its entirety.".

In Column 19, Line 3, delete "LCH-IDO" and insert -- LCH-ID0 --, therefor.

In Column 19, Line 4, delete "LCH-IDO" and insert -- LCH-ID0 --, therefor.

In the Claims

In Column 25, Line 43, in Claim 3, delete "of any" and insert -- of --, therefor.

Signed and Sealed this
Fifth Day of February, 2019

Andrei Iancu
*Director of the United States Patent and Trademark Office*